(No Model.)
T. A. MILLER.
Washing Machine.
No. 241,817.     Patented May 24, 1881.
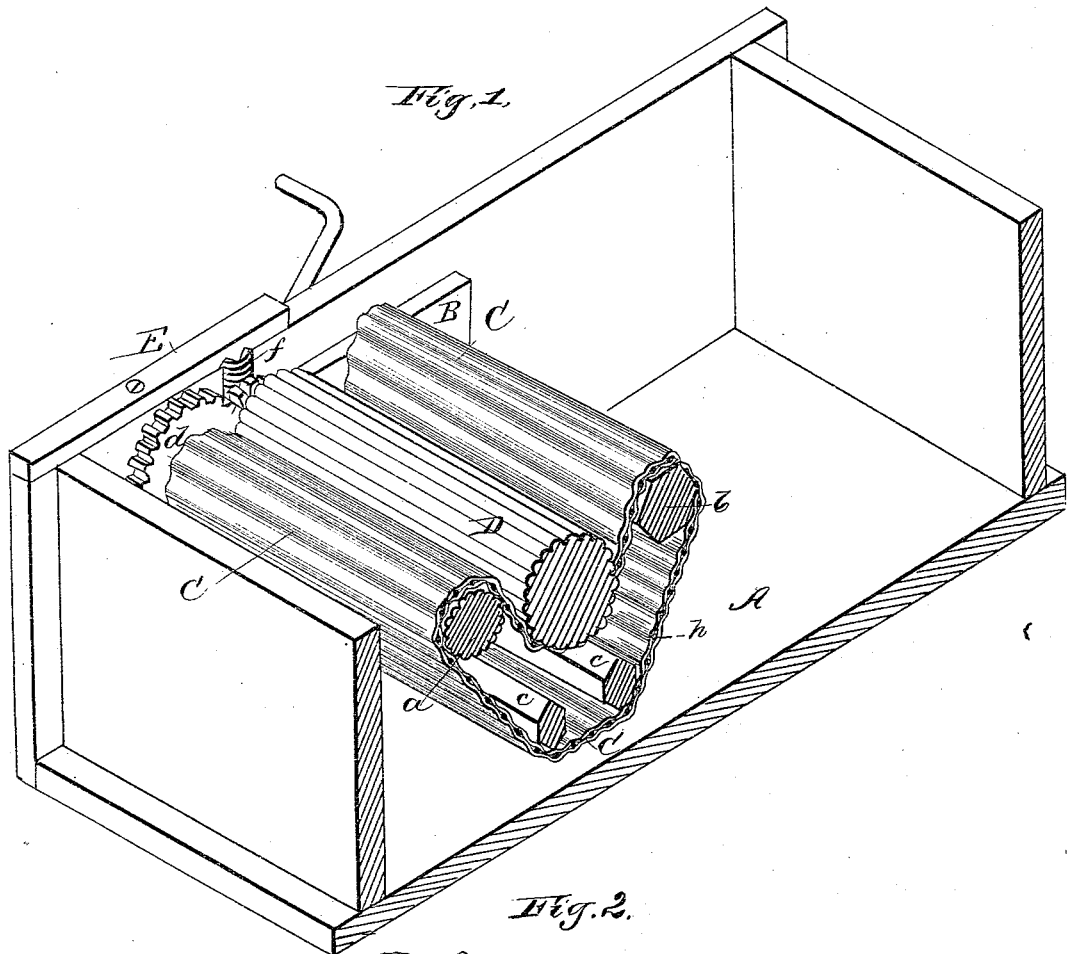
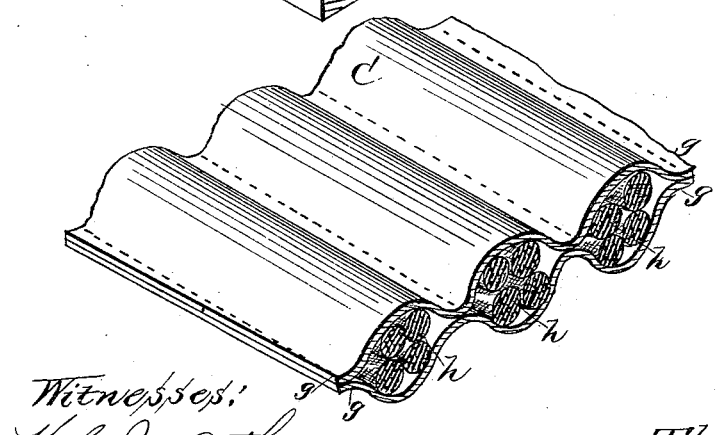
Witnesses:
H. C. McArthur,
G. H. Moore.
Inventor
Thomas A. Miller,
per Chas. H. Fowler,
Attorney.
N. PETERS, Photo-Lithographer, Washington, D. C.

UNITED STATES PATENT OFFICE.

THOMAS A. MILLER, OF GRENOLA, KANSAS.

WASHING-MACHINE.

SPECIFICATION forming part of Letters Patent No. 241,817, dated May 24, 1881.

Application filed March 15, 1881. (No model.)

*To all whom it may concern:*

Be it known that I, THOMAS A. MILLER, a citizen of the United States, residing at Grenola, in the county of Elk and State of Kansas, have invented certain new and useful Improvements in Washing-Machines; and I do hereby declare that the following is a full, clear, and exact description of the same, reference being had to the annexed drawings, making a part of this specification, and to the letters and figures of reference marked thereon.

Figure 1 of the drawings is a perspective view of a washing-machine embodying my invention, partly in section, and Fig. 2 is a detail perspective view of a section of the endless apron.

The present invention has relation to that class of washing-machines in which the clothes are carried by an endless apron passing around suitable rollers, the clothes being acted upon by a fluted or corrugated roller arranged above the apron, and under which the clothes pass.

The invention consists in a corrugated or fluted apron of flexible material, the same being formed of two canvas strips with a filling of rope or other similar fibrous material, said apron passing around suitable rollers in connection with a pressure-roller arranged above said apron, as shown in the drawings, and hereinafter described.

In the accompanying drawings, A represents a trough, preferably of rectangular form, for containing the water and suds.

Upon each side of the trough A are arranged removable frames B, in which the journals of the several rollers have their bearings.

The endless apron C, hereinafter described, passes around suitable rollers, *a b c c*, said rollers being arranged with relation to each other as shown in Fig. 1.

A large fluted or corrugated roller, D, is located above the apron C, on a line between the rollers *a b*, and has a pinion affixed to its journal, for engaging with a large gear-wheel, *d*, upon the journal of the roller *a*. A suitable crank is connected to the journal of the roller D for rotating the same, and through the pinion and gear-wheel motion is imparted to the roller *a*, which moves the apron C along over the rollers.

Any suitable gearing may be employed for operating the rollers and apron, and, if desired, sectional boxes may be employed to rest upon the upper half of the journals of roller D, and held thereon by suitable springs, *f*, and pivoted bars E upon each side of the trough A; or any other desirable means may be substituted that will admit of the roller D being automatically yielding when the clothes pass between it and the apron.

These several features in the construction of the machine may be variously modified, as they form no essential part of my invention, the important element thereof being the particular construction of the endless belt, which I will now proceed to more fully describe.

The apron C consists of two strips or pieces, *g*, of duck or canvas, between which is placed a filling of rope or similar fibrous material. In the present instance I have shown a filling, *h*, of rope, the several strands being shown in section in Fig. 2, the duck or canvas being stitched or sewed together between each filling of rope, to retain them in place and form a continuous series of ribs or corrugations the entire length of the endless apron. This produces a very durable form of endless apron, and it possesses the required flexibility throughout its entire width, thereby yielding to the pressure of the clothes thereon, and presenting a surface that will have the desired effect upon the clothes without wearing or tearing them, as would be the case were the apron composed of a series of longitudinal strips or bars of wood connected together. It is essential to the successful operation of this endless apron upon the clothes, as they pass between it and the corrugated pressure-roller, that the apron shall have its surface fluted or corrugated, and consequently an apron composed simply of a single piece of canvas would not answer the purpose, and the aprons usually employed, which have a fluted or corrugated surface, were constructed of strips of rigid or non-flexible material.

An apron constructed in accordance with my invention possesses all the qualities of a single piece of canvas, with the addition of a pliable and flexible corrugated or fluted surface.

Having now fully described my invention, what I claim as new, and desire to secure by Letters Patent, is—

In a washing-machine, the combination, with a suitable pressure-roller, of an endless apron passing over and around a series of rollers, said apron consisting of two pieces or strips of duck or canvas having between them a filling of rope or other similar fibrous material, said pieces or strips being fastened together between the filling to retain it in place and form a corrugated or fluted surface to the apron, substantially as and for the purpose set forth.

In testimony that I claim the above I have hereunto subscribed my name in the presence of two witnesses.

THOMAS A. MILLER.

Witnesses:
  HAROLD CHILD,
  D. M. REID.